Patented Feb. 10, 1931

1,792,152

UNITED STATES PATENT OFFICE

GEORGE HOLLAND ELLIS AND ERNEST GREENHALGH, OF SPONDON, NEAR DERBY, ENGLAND, ASSIGNORS TO CELANESE CORPORATION OF AMERICA, A CORPORATION OF DELAWARE

TREATMENT OF PRODUCTS OF OR CONTAINING ACETYL CELLULOSE

No Drawing. Application filed July 13, 1925, Serial No. 43,420, and in Great Britain July 28, 1924.

This invention relates to the printing or stencilling of yarns, threads, fabrics, films or other articles made of or containing acetyl cellulose.

The printing or stencilling of such goods with printing or stencilling pastes or preparations is attended with some difficulty owing to the low degree of water absorption shown by acetyl cellulose, so that the dyestuffs, coloring compounds, coloring components or other constituents (e. g. discharge or resist agents) which may be applied in the paste or preparation do not readily penetrate the fibre or material, though they may themselves have an affinity for acetyl cellulose.

We have found that by incorporating in the printing or stencilling pastes or preparations (all hereinafter in the claims included in the term a preparation) employed for the printing or stencilling of said goods suitable agents known as or acting as swelling agents for acetyl cellulose that is to say substances which act upon the surface of the acetyl cellulose fibres, filaments or material in such a way as to render them more easily penetrable, the penetration of the acetyl cellulose fibre or material by the dyestuffs, coloring matters or coloring compounds or components applied in the paste or preparation can be materially improved, and fuller and clearer impressions or stencillings can be obtained.

Any dyestuffs, coloring matters or coloring compounds or components having an affinity for acetyl cellulose (all hereinafter in the claims included in the term organic compound capable of coloring acetyl cellulose), and whether soluble or insoluble in water, may be employed in the pastes or preparations, and/or any suitable or usual ingredients of such pastes or preparations. For instance it is possible to employ ordinary classes of printing color or paste such as are commonly employed for the printing of other textile products, for example basic colors with tannin, mordant colors with chrome or other metallic salts, or discharge and resist pastes comprising the various oxidizing, reducing, acid or alkaline substances, whether such pastes incorporate or not coloring matters intended for colored resists or discharges.

Especially, however, we may employ printing or stencilling pastes, or preparations containing insoluble or relatively insoluble dyestuffs, coloring matters, coloring compounds or components having an affinity for acetyl cellulose (all of which are hereinafter in the claims included in the term relatively water insoluble organic compound capable of coloring acetyl celluose), solubilized or rendered more soluble by pretreatment with solubilizing agents of the class referred to in prior Patent No. 1,618,413, namely bodies of oily or fatty characteristics, i. e. bodies having oily or fatty characteristics containing salt forming groups capable of forming soluble salts with alkalis or ammonia (for example the sulpho group or the carboxyl group or both sulpho and carboxyl groups) or salts of such bodies such for instance as their sodium or other alkali salts or ammonium salts; and the term "body of oily or fatty characteristics" is hereinafter in the claims employed in the same sense as in the said prior Patent No. 1,618,413 to include all such bodies and their salts. Amongst instances of the said class of solubilizing agents the Patent No. 1,618,413 mentions sulphoricinoleic acid and other sulphonated fatty acids and salts of such acids, such as their alkali or ammonium salts.

Or we may employ in the printing or stencilling pastes or preparations, insoluble or relatively insoluble dyestuffs, coloring matters, coloring compounds or components having an affinity for acetyl cellulose, solubilized or rendered more soluble by pretreatment with the solubilizing agents referred to in prior Patent No. 1,618,414.

In any case we have found that by the addition or incorporation of one or more swelling agents in the printing or stencilling preparation or paste, the penetrability of the acetyl cellulose fibre or material to the coloring matters, coloring compounds or components or/and other constituents of the paste or preparation may be increased so as to obtain deeper and fuller impressions or stencillings with less liability of the color to "mark off" or spread into the unprinted or unstencilled parts of the fibre or material.

Such swelling agents may vary in character, but we have found it particularly successful to employ thiocyanates of alkali metals or of ammonia, where a neutral or alkaline printing paste or stencilling preparation is to be employed, or zinc nitrate or zinc chloride where the paste or preparation is amenable to the addition of such somewhat acidic salts. As a further instance of swelling agents, phenol and the like may be mention. It is understood, however, that any other known or suitable substances having a swelling action on acetyl cellulose may be employed.

In applying the process according to the invention the chosen swelling agent or agents are simply incorporated in suitable quantities in the printing or stencilling paste or preparation at any stage, the paste or preparation being applied by any of the usual methods employed in the art.

After printing or stencilling, the usual drying may follow or the prints or stencilled materials may then be suitably "aged" or "steamed" or further rinsed, soaped and finished as desired.

The following examples will serve to illustrate the present invention, it being understood that they are given only as instances and may be varied widely.

EXAMPLE 1

To print a bluish-red shade on cellulose acetate, for example in form of woven or knitted fabric.

*Thickening*

|  | Grams |
|---|---|
| Dark British gum | 600 |
| Gum arabic (50% aqueous solution) | 600 |
| Water | 800 |
| Total | 2000 |

The British gum is dissolved in a little water, mixed with the gum arabic solution and more water added, the whole is then boiled for 10 minutes and made up to bulk.

*Coloring matter paste*

4 grams of 2-4 dinitrobenzene 1-azo dimethylaniline are finely ground with 12 ccs. of water. 24 grams of 70% sodium ricinoleate are added and the whole mass heated until dispersion is as complete as possible. This then serves for making up the printing color as follows:—

*Printing color*

|  | Grams |
|---|---|
| Coloring matter paste (prepared as above) | 40 |
| Soda ash | 5 |
| Ammonium thiocyanate | 20 |
| Water | 40 |
| Thickening (prepared as above) | 295 |
| Total | 400 |

The soda ash, dissolved in a little water, is added to the coloring matter paste, which is then intimately mixed with the thickening: the ammonium thiocyanate dissolved in water is added, and the whole brought to the boil and bulked.

The cellulose acetate, e. g. in form of woven or knitted fabric, is printed by any of the recognized methods: dried, preferably by hot air, steamed in dry steam for 15 to 20 minutes soaped lightly at 60° C., washed in soft water and dried.

EXAMPLE 2

To print a shade of tangerine on cellulose acetate, for example in form of woven or knitted fabric.

*Coloring matter paste*

4 grams of paranitrobenzene azo diphenylamine are finely ground with 12 ccs. of water. 24 grams of 70% ammonium salt of sulphoricinoleic acid are added and the whole mass heated until dispersion is as complete as possible. This then serves for making up the printing color as follows:—

*Printing color*

|  | Grams |
|---|---|
| Coloring matter paste (prepared as above) | 40 |
| Water | 50 |
| Phenol | 4 |
| Turkey red oil 50% | 6 |
| Thickening (as in Example 1) | 300 |
| Total | 400 |

The phenol is intimately mixed with hot Turkey red oil until as well dispersed as possible and the dispersion added to the coloring matter paste: the whole is mixed with the thickening and a little water, and made up to bulk.

The printing and subsequent treatments are carried out as in Example 1.

EXAMPLE 3

To print a bright blue (with basic color) on cellulose acetate e. g. in form of woven or knitted fabric.

*Acid thickening*

|  | Grams |
|---|---|
| Corn starch | 450 |
| Formic acid 90% | 200 |
| Water | 1350 |
| Total | 2000 |

The starch is pasted with a little cold water until smooth, the formic acid and more water added and the whole boiled until the paste begins to thin.

*Printing color*

| | Grams |
|---|---|
| Acid thickening | 260 |
| Capri blue G O N (Leonhardt) (color index No. 876) | 4 |
| Formic acid 90% | 20 |
| Water | 96 |
| Zinc chloride | 4 |
| Tannic acid 50% | 16 |
| Total | 400 |

The Capri blue G O N is dissolved in a little water containing the formic acid, and the solution is mixed with the acid thickening, boiled and cooled. Just before printing, the tannic acid is intimately mixed with the printing paste, and finally the zinc chloride dissolved in a little water is added. The goods are printed, dried, steamed for 25 minutes, and fixed by passage through a liquor as follows:—

| | Grams |
|---|---|
| Tartar emetic | 20 |
| Chalk | 10 |
| Water | 970 |

The goods are then washed, malted, washed soaped, washed and dried as may be desired.

EXAMPLE 4

For discharging cellulose acetate fabric dyed with a dischargeable color e. g. benzene-azobenzene azo phenol the process may be as follows:—

*Printing paste*

| | Grams |
|---|---|
| Rongalite | 80 |
| Anthraquinone paste 30% | 40 |
| Ammonium thiocyanate | 20 |
| Thickening (as in Examples 1 and 2) | 180 |
| Water | 80 |
| Total | 400 |

The rongalite employed in this example is the ordinary sodium formaldehyde-sulphoxylate reagent used for discharge printing.

To the cooled thickening are added the rongalite and ammonium thiocyanate dissolved in water, and finally the anthraquinone paste, and the whole is intimately mixed and bulked. The goods are printed, dried, steamed for 20 minutes in dry steam, washed, soaped at 80° C. with ½% soap solution, washed, dried and finished as may be desired.

It is to be understood that the invention likewise includes the printing or stencilling pastes or preparations containing the swelling agent or agents. It is also to be understood that the terms "substance capable of effecting a colour change" used in the appended claims includes dyestuffs or components, discharges, and resists.

What we claim and desire to secure by Letters Patent is:—

1. A process for producing colored patterns on material comprising acetyl cellulose, comprising locally applying to said material a preparation comprising a swelling agent for the acetyl cellulose and a substance capable of effecting a color change.

2. A process for producing colored patterns on material comprising acetyl cellulose, comprising locally applying to said material a preparation comprising a swelling agent for the acetyl cellulose and an organic compound capable of coloring acetyl cellulose.

3. A process for producing colored patterns on material comprising acetyl cellulose, comprising locally applying to said material a preparation comprising a swelling agent for the acetyl cellulose and a substance capable of effecting a color change and subsequently steaming.

4. A process for producing colored patterns on material comprising acetyl cellulose, comprising locally applying to said material a preparation comprising a swelling agent for the acetyl cellulose and an organic compound capable of coloring acetyl cellulose and subsequently steaming.

5. A process for producing colored patterns on material comprising acetyl cellulose, comprising locally applying to said material a preparation comprising a swelling agent for the acetyl cellulose and a relatively water-insoluble organic compound which is capable of coloring acetyl cellulose and which has been solubilized by pretreatment with at least one body of oily or fatty characteristics.

6. A process for producing colored patterns on material comprising acetyl cellulose, comprising locally applying to said material a preparation comprising a thiocyanate and a substance capable of effecting a color change.

7. A process for producing colored patterns on material comprising acetyl cellulose, comprising locally applying to said material a preparation comprising a thiocyanate and an organic compound capable of coloring acetyl cellulose.

8. A process for producing colored patterns on material comprising acetyl cellulose, comprising locally applying to said material a preparation comprising a thiocyanate and an organic compound which is capable of coloring acetyl cellulose and which has been solubilized by pretreatment with at least one body of oily or fatty characteristics.

9. A process for producing colored patterns on material comprising acetyl cellulose, comprising locally applying to said material a preparation comprising ammonium thiocyanate and a substance capable of effecting a color change.

10. A process for producing colored patterns on material comprising acetyl cellulose, comprising locally applying to said material a preparation comprising ammonium thiocyanate and an organic compound capable of coloring acetyl cellulose.

11. A process for producing colored patterns on material comprising acetyl cellulose, comprising locally applying to said material a preparation comprising ammonium thiocyanate and an organic compound which is capable of coloring acetyl cellulose and which has been solubilized by pretreatment with at least one body of oily or fatty characteristics.

12. A process for producing colored patterns on dyed materials comprising acetyl cellulose, comprising locally applying to said material a preparation comprising a swelling agent for the acetyl cellulose and a substance capable of effecting a color change.

13. A process for producing colored patterns on dyed materials comprising acetyl cellulose, comprising locally applying to said material a preparation comprising a swelling agent for the acetyl cellulose and a substance capable of effecting a color change by discharging the dye.

14. A process for producing colored patterns on dyed materials comprising acetyl cellulose, comprising locally applying to said material a preparation comprising a thiocyanate and a substance capable of effecting a color change by discharging the dye.

15. A process for producing colored patterns on dyed materials comprising acetyl cellulose, comprising locally applying to said material a preparation comprising ammonium thiocyanate and a substance capable of effecting a color change by discharging the dye.

16. A process for producing colored patterns on dyed materials comprising acetyl cellulose, comprising locally applying to said material a preparation comprising a swelling agent for the acetyl cellulose and a reducing agent to effect the discharge of the dye.

17. A process for producing colored patterns on dyed materials comprising acetyl cellulose, comprising locally applying to said material a preparation comprising a thiocyanate and a rongalite discharging agent.

18. A process for producing colored patterns on dyed materials comprising acetyl cellulose, comprising locally applying to said material a preparation comprising ammonium thiocyanate and a rongalite discharging agent.

19. The process of making a preparation for the production of discharge effects on acetyl cellulose materials which comprises the addition of sulphocyanides to the usual sodium formaldehyde-sulphoxylate discharge printing pastes.

20. As a new article of manufacture, a preparation for the production of discharge effects on materials containing acetyl cellulose comprising the usual sodium formaldehyde-sulphoxylate discharge printing paste and also comprising a sulphocyanide.

In testimony whereof we have hereunto subscribed our names.

GEORGE HOLLAND ELLIS.
ERNEST GREENHALGH.